United States Patent
Flores et al.

(10) Patent No.: US 12,130,031 B2
(45) Date of Patent: Oct. 29, 2024

(54) SYSTEM AND METHOD FOR MONITORING A HOME ENVIRONMENT OF UTILITY DEVICES

(71) Applicant: HG Home Guardian Inc., Newport Beach, CA (US)

(72) Inventors: Keith E. Flores, Corona del Mar, CA (US); Mark W. J. Kelly, Corona del Mar, CA (US)

(73) Assignee: HG Home Guardian Inc., Newport Beach, CA (US)

( * ) Notice: Subject to any disclaimer, the term of this patent is extended or adjusted under 35 U.S.C. 154(b) by 0 days.

(21) Appl. No.: 18/596,330

(22) Filed: Mar. 5, 2024

(65) Prior Publication Data

US 2024/0302063 A1   Sep. 12, 2024

Related U.S. Application Data

(60) Provisional application No. 63/450,334, filed on Mar. 6, 2023.

(51) Int. Cl.
*F24F 11/30* (2018.01)
*G05B 15/02* (2006.01)
*F24F 130/10* (2018.01)

(52) U.S. Cl.
CPC .............. *F24F 11/30* (2018.01); *G05B 15/02* (2013.01); *F24F 2130/10* (2018.01)

(58) Field of Classification Search
CPC ........ F24F 11/30; F24F 2130/10; G05B 15/02
See application file for complete search history.

(56) References Cited

U.S. PATENT DOCUMENTS

| | | | |
|---|---|---|---|
| 10,599,116 B2 * | 3/2020 | Pillai | G16H 20/60 |
| 10,601,604 B2 * | 3/2020 | Kozura | H04L 12/2832 |
| 11,133,953 B2 * | 9/2021 | Shive | G06N 5/04 |
| 11,316,709 B2 * | 4/2022 | Brown | H04L 12/282 |
| 11,668,481 B2 * | 6/2023 | Granger | F24F 11/30 |
| | | | 700/276 |
| 11,844,163 B2 * | 12/2023 | Campanella | H05B 47/115 |
| 2013/0268125 A1 * | 10/2013 | Matsuoka | G05D 23/1917 |
| | | | 700/276 |
| 2015/0276237 A1 * | 10/2015 | Daniels | G05D 23/1905 |
| | | | 237/2 A |
| 2015/0276239 A1 * | 10/2015 | Fadell | G05B 15/02 |
| | | | 236/51 |
| 2015/0373149 A1 * | 12/2015 | Lyons | H04L 12/2829 |
| | | | 709/203 |

(Continued)

*Primary Examiner* — Ramesh B Patel
(74) *Attorney, Agent, or Firm* — Innovent Law P.C.; Karima F. Gulick

(57) ABSTRACT

A monitoring system for monitoring a home having a plurality of utility devices comprises operation sensors, environment sensors, and a central station. The operation sensors measure performance of the utility devices. The environment sensors generate environment data associated with the home. The central station is configured to: determine conditions of the utility devices based on at least the operation data and the environment data, manipulate at least one of the utility devices based on at least the operation data and the environment data, and make personalized recommendations based on at least the operation data, the environment data, and behaviors of at least one occupant of the home.

20 Claims, 8 Drawing Sheets

(56) References Cited

U.S. PATENT DOCUMENTS

| | | | |
|---|---|---|---|
| 2016/0116343 A1* | 4/2016 | Dixon | G05B 15/02 |
| | | | 250/342 |
| 2017/0261951 A1* | 9/2017 | Bandara | G06Q 50/06 |
| 2020/0167834 A1* | 5/2020 | Matsuoka | G06Q 30/0278 |
| 2022/0093109 A1* | 3/2022 | Orr | H04L 12/282 |
| 2024/0127090 A1* | 4/2024 | Spero | H05B 47/125 |

* cited by examiner

SYSTEM AND METHOD FOR MONITORING A HOME ENVIRONMENT OF UTILITY DEVICES

BACKGROUND OF THE INVENTION

1. Field of the Invention

This invention relates to methods and systems for collecting sensor measurements of physical attributes associated with a home and its immediate surroundings, determining the existence of safety threats based on the measurements, notifying home owner or service providers of the safety threat, and actively providing mitigation or solution to detected safety threat.

2. Description of the Related Art

Smart-home devices, such as smart outlets, smart lights, smart speakers, home assistant devices, smart thermostats, and smart hazard detectors are becoming common in homes worldwide. Generally, the smart-home devices are made by different manufacturers and each is connected to different servers over the internet for data transmission and control. Thus, one server connected to one smart-home device will not know what the other smart-home devices measures and how they functions. However, one safety threat to the home can be manifested as different physical attributes that can be measured by different smart-home devices. For instance, the measurements/readings of the smoke sensor, smart thermostats, smart camera, and natural gas flow meter can individually or collectively indicate the existence of a fire caused by gas leakage at home. Thus, to arrive at a more accurate assessment of the safety status of the home, there is advantages in collecting the data from all smart-home devices and performing a holistic analysis of said data.

Also, home electronic devices that can be controlled remotely using software applications running on a computing device, such as a mobile phone, tablet computer, laptop computer, desktop computer, or the like, have become increasingly popular. For example, numerous manufacturers create light bulbs that can be controlled by a software application running on a mobile phone to adjust the brightness and/or color of the bulb. Other devices, such as door locks, thermostats, and the like, having similar controls are also available. However, it can become exceedingly difficult to manage these devices as the number of remotely controlled devices and the number of types of remotely controlled devices in the home increase. Also, the user or service provider may not be timely in controlling the smart-home devices to solve the safety threat that has just occurred.

Accordingly, there is a need for a centralized system having a central station that collects sensor measurements associated with an indoor section and its immediate surroundings, determines the existence of safety threats or hardware breakdown based on the measurements, notifies home owner or service providers regarding the safety threat, and actively provides solution to the safety threat.

BRIEF DESCRIPTION OF THE DRAWINGS

It should be noted that the drawing figures may be in simplified form and might not be to precise scale.

DETAILED DESCRIPTION OF THE INVENTION

The embodiment and various other embodiments can now be better understood by turning to the following detailed description of the embodiments, which are presented as illustrated examples of the embodiment defined in the claims. It is expressly understood that the embodiment as defined by the claims may be broader than the illustrated embodiments described below. Many alterations and modifications may be made by those having ordinary skill in the art without departing from the spirit and scope of the embodiments.

Figure 1:
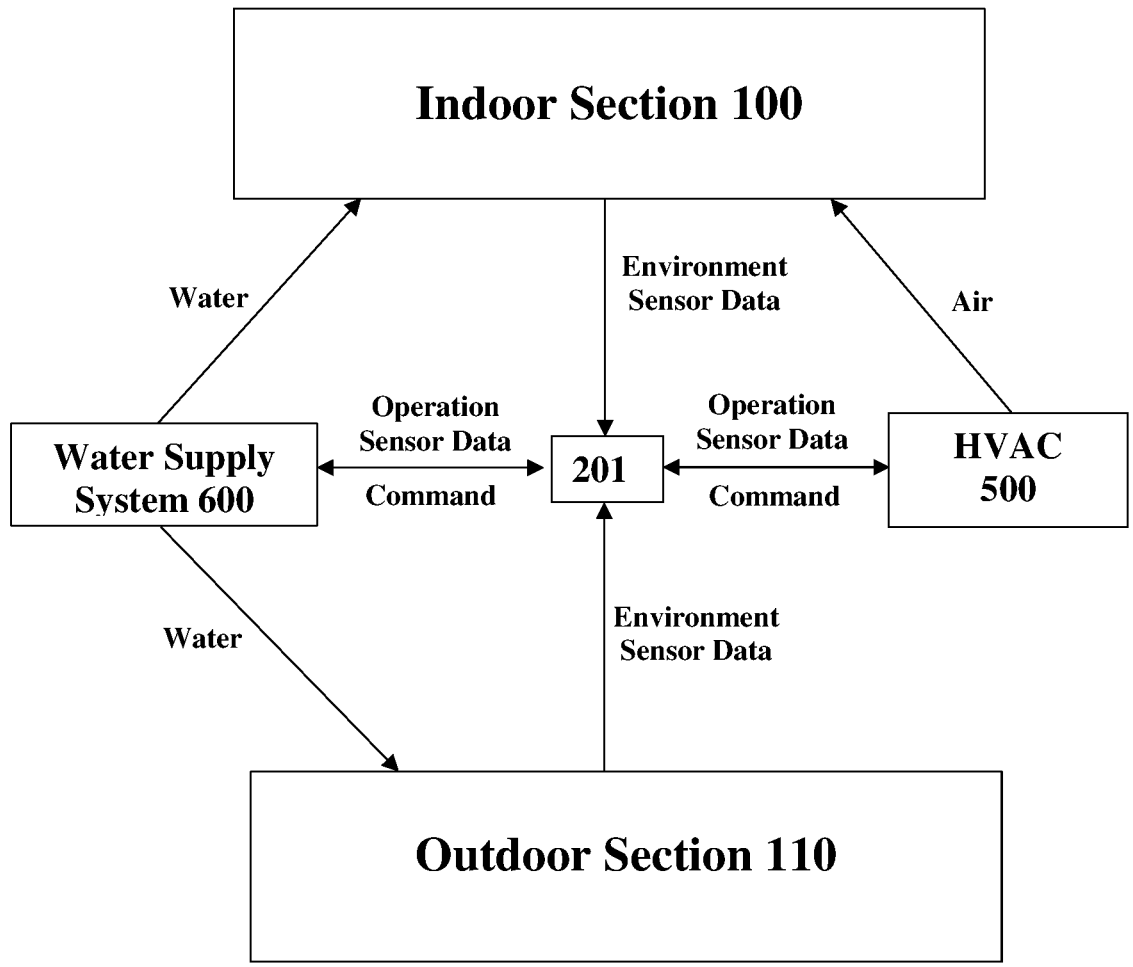
FIG. 1 is a block diagram of a monitored home environment in accordance with a first embodiment of the present disclosure.

FIG. 1 is a block diagram of a monitored home environment in accordance with a first embodiment of the present disclosure. The home environment includes an indoor section 100 and an outdoor section 110. The indoor section 100 in the first embodiment is a house having a plurality of basic utility equipment such as internet, cable TV, electricity, water, sewage, natural gas, trash and recycling, phone services, and security. The outdoor section 110 includes a home garden, a spa, and a pool and may share with the indoor section 100 the same basic utility equipment such as water and security. The indoor section 100 and outdoor section 110 can further includes smart home devices connected to a network and configured to some extent interactively and autonomously, such as smart thermostats, refrigerators, freezers, clothes washers, clothes dryers, light bulbs, light fixtures, dishwashers, pool pumps, electric vehicle chargers (AC-Output), ceiling fans, commercial ice machines, etc.

The utility equipment for heating, ventilating, and cooling air are collectively called Heating, Ventilation, and Air Conditioning (HVAC) 500. The utility equipment responsible for conveying water are collectively called the water supply system 600.

FIG. 1 also illustrates the monitoring system according to the first embodiment of the present disclosure. The monitoring system is configured to measure performance of the utility equipment within the monitored home environment (such as HVAC 500 and the water supply system 600) using various sensors, and measure physical parameter associated with the monitored home environment (such as temperature and humidity). The monitoring system includes a central station 201 configured to determine conditions of the utility equipment based on the measurements, manipulate the utility equipment based on the conditions of the utility equipment and other sensor measurements, and make recommendations based on at least the measurements and behaviors of the occupants in the home environment. The monitoring system includes a plurality of operation sensors either connected directed to or disposed near the above-mentioned basic and smart devices to generate operation data associated with performance of the utility equipment. The monitoring system also includes a plurality of environment sensors to measure physical parameter of the home environment such as indoor/outdoor temperature, indoor/outdoor humidity, water acidity, sound occurring at specific location of the home environment, etc. The monitoring system can use the measurements of the environment sensors together with performance measurements of the utility equipment to accurately determine the performance of the utility equipment and whether these devices require maintenance or replacement soon.

The monitoring system of the present disclosure includes an air supply monitor system and an air quality monitor system configured to measure the performance of various components in the HVAC 500 and the quality of air that the HVAC 500 produces. The monitoring system further includes a water device monitor system and a water quality monitor system configured to measure the performance of various components in the water supply system 600 and the quality of water that the water supply system 600 produces. The monitoring system further includes an undesirable activity monitor system configured to expose hazardous or illegal activities occurring in the indoor section 100 or the outdoor section 110. The above-mentioned monitor systems respectively includes various sensors and will be further described below.

Figure 2:
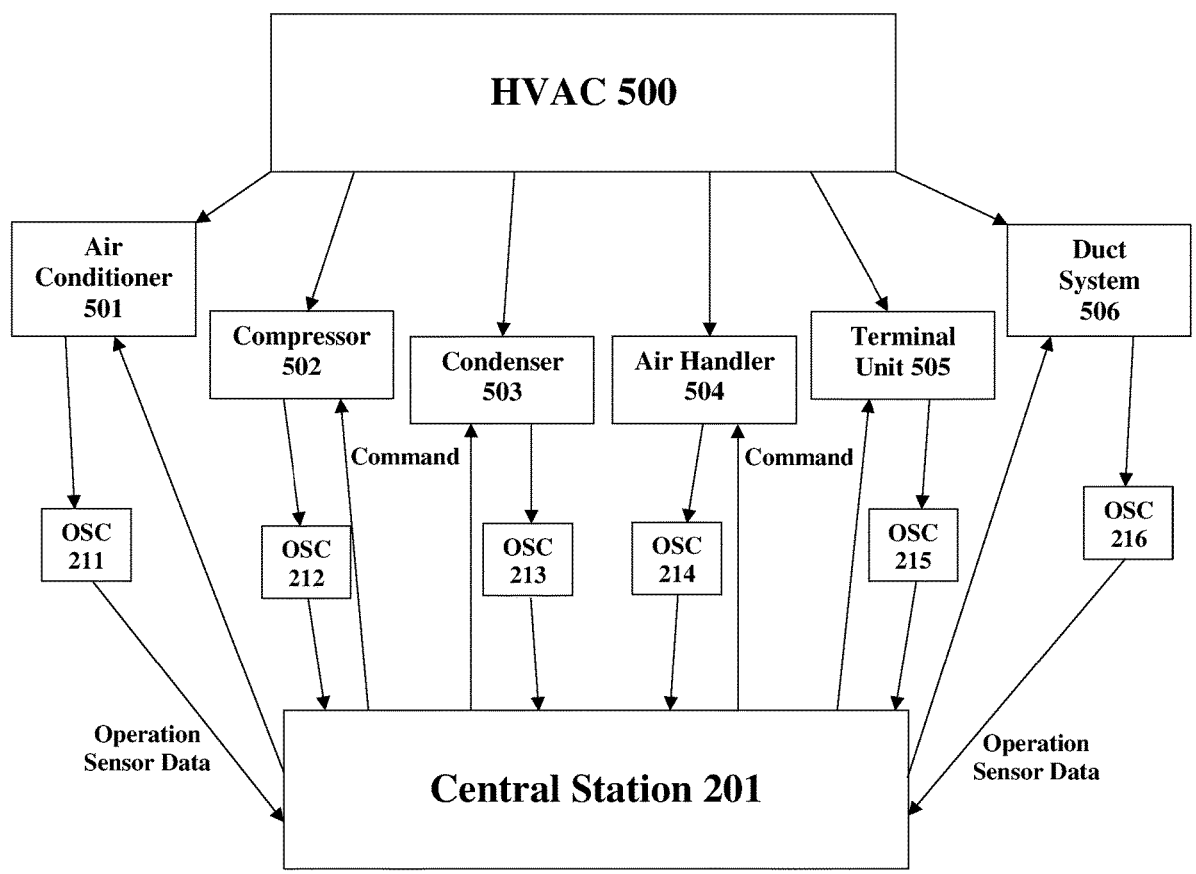
FIG. 2 is a block diagram of the monitoring system according to the first embodiment having a central station and an air supply monitoring system for monitoring and regulating the utility equipment responsible for heating, ventilation, and cooling of air within an indoor section of the monitored home environment.

FIG. 2 is a block diagram illustrating the monitoring system having a central station 201 and the air supply monitoring system connected to the utility equipment responsible for heating and cooling of air within the indoor section 100. The utility equipment for heating, ventilating, and cooling air are collectively called Heating, Ventilation, and Air Conditioning (HVAC) 500 and include an air conditioner 501, a compressor 502, a condenser 503, an air handler 504, a terminal unit 505, and a duct system 506.

The air conditioner 501 dehumidify the air and remove heat, but does not cool the building by itself and needs to work with other subsystems to regulate the temperature of the indoor section 100. The compressor 502 contains refrigerant initially in the gaseous state and compresses the gaseous refrigerant to raise the refrigerant's temperature and change it into a high pressure gas. The high pressure forces the refrigerant through a line that leads to the outdoor coil, where the refrigerant releases its heat and condenses into a liquid. The liquid refrigerant then continues its trip to the indoor unit, where the refrigerant evaporates into a gas again and absorbs the heat from inside your home. The refrigerant than returns to the compressor 502 and cycle starts again. In short, the compressor 502 compresses the refrigerant to raise its temperature. The refrigerant is then passed on to the condenser 503, where the cooling process can start. The condenser 503 further includes a thermal expansion valve that removes pressure from the liquid refrigerant so expansion can take place, turning the substance from a liquid into a vapor. In different embodiments, the air conditioner that uses air to transport heat can be replaced with a chiller that uses water to transport heat.

The air handler 504 blows cooled or heated air into the building and then returns it back into the system. The air handler 504 includes evaporator coil for holding chilled refrigerant received from the compressor 502. As air from the blower fan moves over the evaporator coil, heat is removed from the air in the treated area. The terminal units 505 includes an air filter, a coil, and a blower. The duct system 506 is responsible for transporting air from the above-mentioned utility equipment through the indoor section 100.

The air device monitoring system includes a plurality of operation sensor clusters 211, 212, 213, 214, 215, 216 either connected directly to or disposed near the air conditioner 501, the compressor 502, the condenser 503, the air handler 504, the terminal unit 505, and the duct system 506. The operation sensor clusters 211-216 include vibration sensors, temperature sensors, and acoustic sensors and are respectively configured to measure vibration, temperature, and sound associated with the above-mentioned utility equipment 501-506 and generate corresponding operation data. The central station 201 then process the operation data in order to detect early signs of wear, suboptimal efficiency, or degradation needing repair and proactively send alerts before outright failure occurs to prevent discomfort or accident. Please note that each of the operation sensor clusters 211, 212, 213, 214, 215, 216 may further include sensors of different functions and sizes and the sensors of the same clusters may be disposed in separate locations and not placed in a confined space.

The operation sensor cluster 216 corresponding to the duct system 506 includes a pressure sensor or other airflow sensor configured to measure the airflow within the duct system 506. The central station 201 can then create an airflow map using the operation data generated by the operation sensor cluster 216 to map out the air flow in the duct system 506. In different embodiments, the central station 201 can use other data such as pressure in the outdoor section 110 and occupancy patterns in various zones of the indoor section 100 to arrive at a more accurate airflow map within both the duct system 506 and the indoor section 100 as a whole. Further, utilizing airflow mapping of the home's ductwork through atmospheric pressure sensors, indoor/outdoor air quality data, and occupancy patterns in different zones in the indoor section allows the central station 201 to intelligently direct fresh air ventilation to spaces with occupants that needing it most to balance air quality and energy efficiency.

As illustrated in FIG. 2, the central station 201 is connected to the air conditioner 501, the compressor 502, the condenser 503, the air handler 504, the terminal unit 505, and the duct system 506. The central station 201 is configured to regulate operations of the above-mentioned utility equipment based on the operation data from the various sensors 211-216. By installing vibration, temperature, and performance sensors on components like compressors, motors, and ducts combined with air quality monitoring, the system could detect early signs of wear, suboptimal efficiency, or degradation needing repair and proactively send alerts before outright failure occurs to prevent discomfort. Also, utilizing airflow mapping of the home's ductwork through wireless pressure sensors combined with indoor/outdoor air quality data and occupancy patterns in different zones, the system could intelligently direct fresh air ventilation to spaces needing it most to balance air quality and energy efficiency.

In addition to indicate the current performance of the utility equipment, measurements from the operation sensors 211-216 can also provide valuable insights to manufacturers for optimizing future product designs. The operational data provides a digital fingerprint and a detailed understanding of the various parts of the utility equipment. Collectively, these operation data provide rich data points that could be used to train a machine learning system to provide better insight into their status and overall state of health.

Figure 3:
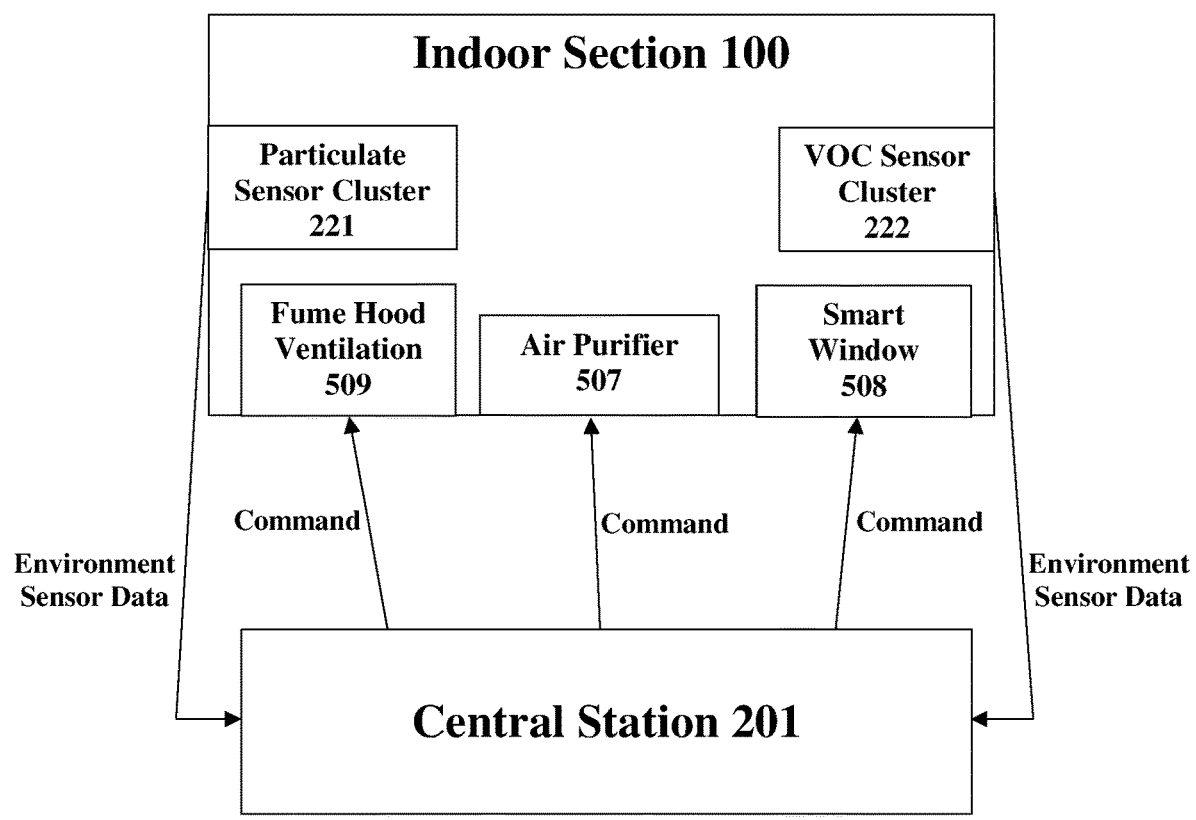
FIG. 3 is a block diagram of the monitoring system according to the first embodiment having the central station and an air quality monitor system for monitoring and regulating the utility equipment responsible for the air quality in the indoor section of the monitored home environment.

FIG. 3 is a block diagram illustrating the central station 201 and the air quality monitor system connected to the HVAC 500 also responsible for monitoring and regulating air quality within the indoor section 100. The air quality monitor system includes a plurality of environment sensors disposed in the indoor section 100 and configured to measure air quality within the indoor section 100. More specifically, the environment sensors of the air quality monitor system are configured to measure particulate matters, volatile organic compound (VOC), humidity, and other matters in the air that may trigger asthma. The air quality environment sensors includes hyperlocal particulate sensor cluster 221 and VOC sensor cluster 222 placed in building ductwork (such as duct system 506) and hallways to pinpoint specific units responsible for emitting contamination from activities like smoking, cooking, and chemicals rather than just general area trends. The central station 201 first process the environment data generated by the environment sensors to determine the air quality in each room in the indoor section 100 and then identify rooms with air quality that may trigger asthma or other allergen/irritant hot spots in the indoor section.

In the present embodiment, the utility equipment includes air purifiers 507 (such as high efficiency particulate air (HEPA) air purifier) connected to the central station 201 and configured to trap matters in the air that may trigger asthma. Once the central station 201 pinpoints the allergen hot spot, it can then perform targeted/localized air purification by automatically turning on the air purifier 507 within or near the allergen hot spot to trap identified allergen/irritant. The above-mentioned targeted air purification saves energy by activating specific air purifier instead of continually filter all home air. Further, the central station 201 includes a network device configured to wirelessly receive weather forecasts and user health data from external devices. Thus, the central station 201 can integrate the above-mentioned air quality environment data with weather forecasts and the user's health data to estimate impending risk levels for asthma attacks when pollen counts or pollution are elevated in advance. The central station 201 can be configured to automatically send alerts to occupants of the indoor section 100 advising precautionary measures. The central station 201 can also predict potential seasonal contamination based on air quality environment data and weather forecasts and preemptively reconfigure the operation schedule of the air purifier 507 ahead of seasonal contamination and potential health risks.

The environment sensor of the present disclosure includes presence detector that makes use of radar technology, infrared technology, ultra-sonic technology, or laser technology to identify sensitive household member at the indoor section 100 such as elderly. The central station 201 can then adjusts the air purifier 507 to optimize the ventilation rates, humidity levels, and air filtration to maintain a basic respiratory health threshold for sensitive occupants of the indoor section 100. In the event that environment sensors detect zones with dangerously high allergen levels within the indoor section 100, the central station 201 can trigger and transmit emergency alerts while engaging air purifier 507 on maximum capacity. If the central station 201 detect an attack, it can send out urgent SMS and calls to emergency contacts or responders. The main focus is tailoring smart home technology to protect those suffering from chronic respiratory conditions by continually monitoring asthma triggers and automatically engaging systems to purify, alert, and moderate conditions in the home environment when needed.

The utility equipment also includes smart windows 508 that the central station 201 can activate to further optimize the ventilation rate to improve air quality within the indoor section 100. In another instance, should high VOC signatures associated with cleaning products or cooking smoke are suddenly detected, the central station 201 can first automatically open smart windows and then engage fume hood ventilation 509 before circulating possibly contaminated air to other areas through central HVAC 500. The key focus here is using granular, correlated data and automated air handling protocols to minimize neighborly impacts from contaminant-producing activities while empowering residents to understand the link between behaviors and indoor air pollution in apartment buildings specifically.

Figure 4:
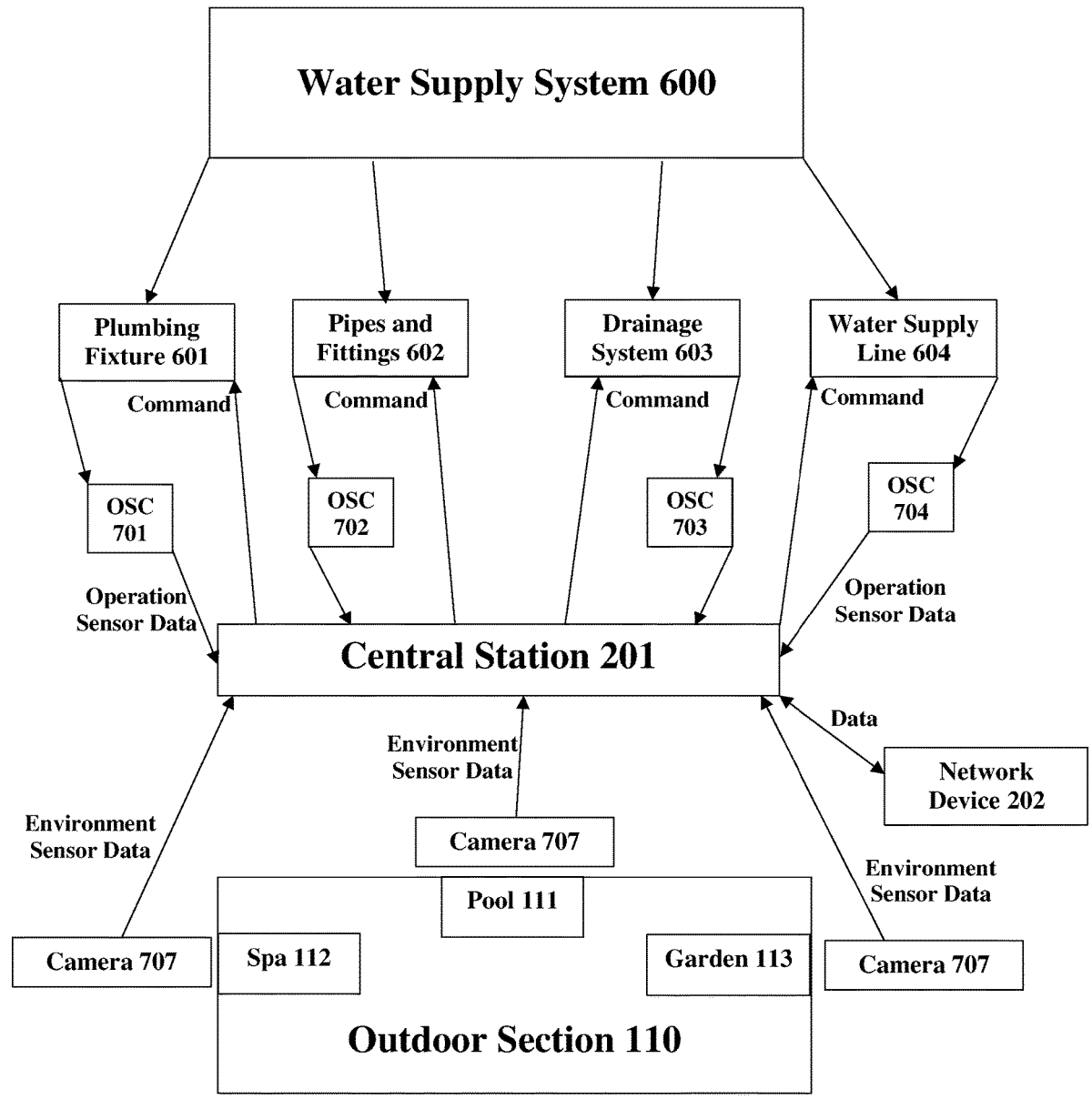
FIG. 4 is a block diagram of the monitoring system according to the first embodiment having the central station and a water device monitoring system for monitoring and regulating the utility equipment responsible for conveying water in the indoor section and the outdoor section of the monitored home environment.

FIG. 4 is a block diagram illustrating the central station 201 and a water device monitoring system connected to the utility equipment responsible for conveying water in the indoor section 100 and the outdoor section 110. The utility equipment responsible for conveying water are collectively called the water supply system 600 and includes plumbing fixtures 601, pipes and fittings 602, and a drainage system 603, and a water supply line 604. The plumbing fixtures 601 provide a vessel for us to access water carried through the pipes in our plumbing system. The plumbing fixtures 601 include, toilets, sinks, showers, bathtubs, washing machines, dishwashers, and water heaters. The pipes and fittings 602 carry water to various rooms and act as pathways for transporting liquid or semi-liquid wastes from the plumbing fixtures 601 to the drainage system 603. The pipes and fittings 601 come in different sturdy materials like copper, PVC, lead, and brass. The drainage system 603 is the interconnection of the plumbing fixtures 601 and the pipes and fittings 602 in the indoor section 100 that leads all the water and waste materials to the main sewer lines.

The water device monitoring system includes a plurality of operation sensor clusters 701, 702, 703, 704 either directly connected to or disposed near plumbing fixtures 601, pipes and fittings 602, drainage system 603, and the water supply line 604 respectively. The operation sensor clusters 701-704 include vibration sensors, temperature sensors, and acoustic sensors and are configured to measure vibration, temperature, and sound associated with the above-mentioned utility equipment 601-604 and generate corresponding operation data. The central station 201 then process the operation data from the operation sensor clusters 701-704 to detect early signs of leak, wear, suboptimal efficiency, or degradation needing repair and proactively send alerts before outright failure occurs to prevent discomfort. Please note that each of the operation sensor clusters 701-704 may further include sensors of different functions and sizes and these sensors may be disposed in separate locations and not disposed in a confined space.

In the indoor section 100, the operation sensor clusters (OSC) 701-704 can be used to detect water leakage within any of plumbing fixtures 601, pipes and fittings 602, drainage system 603, and the water supply line 604. The operation sensor clusters 701-704 can be acoustic sensors configured to measure sounds within the above-mentioned utility equipment 601-604 and generate operation data corresponding to the sound detected. The central station 201 can use both the sound operation data and the real-time water flow rate data to identify the location of leaks in the utility equipment 601-604 early. Upon detection, the central station 201 could automatically divert water flow away from the damaged sections causing the leaks and send an inspection request to minimize water loss and prevent mold risks.

The central station 201 can also be configured to optimize the use of water heater of the plumbing fixtures 601. As mentioned above, the central station 201 includes a network device 202 configured to wirelessly receive temperature forecasts and energy prices from external devices. The central station 201 can also determine usage patterns of the water heater by analyzing the operation data from the operation sensors 701-704. The central station 201 can then adjust the operation of water heater to intelligently optimize water heating schedules and temperature settings to ensure hot water availability when needed while minimizing standby losses and energy costs, integrating electric, gas, and solar thermal sources seamlessly.

The water device monitoring system can also be used to measure the performance of the utility equipment in the outdoor section 110 having a pool 111, a spa 112, and a garden 113. The operation sensor clusters 701-704 include sensors either directly connected to or disposed near the utility equipment responsible for conveying water to the pool 111, spa 112, and garden 113. The operation sensors 701-704 can be acoustic sensors configured to measure sounds within the above-mentioned water utility equipment the outdoor section 110 and generate operation data corresponding to the sound detected. The central station 201 can use both the sound operation data and the real-time water flow rate data to identify the location of leaks in the outdoor section 110 early. Upon detection, the central station 201 could automatically shut-off water or divert water flow away from the damaged sections causing the leaks and then send an inspection request to minimize water loss or prevent mold risks.

The water device monitoring system of the present embodiment can also be used to perform poolside safety monitoring and generate timely alert to discovered danger. The water device monitoring system 230 includes cameras 707 disposed around the pool and configured to take pictures of the pool area 111. The central station 201 can use computer vision techniques to process the pictures to actively watch for incidents like slips, falls, injuries, and unaccompanied minors/elderly in the pool area and provide alerts to lifeguards, emergency contacts, or first responders as needed to potentially saving lives. The same cameras 707 can also be installed within the indoor section 100 to take pictures of the indoor areas. The central station 201 can use computer vision techniques to process the pictures to actively watch for incidents like slips, falls, injuries, and unaccompanied minors/elderly in the indoor section and provide alerts to emergency contacts or first responders as needed, potentially saving lives.

Figure 5:
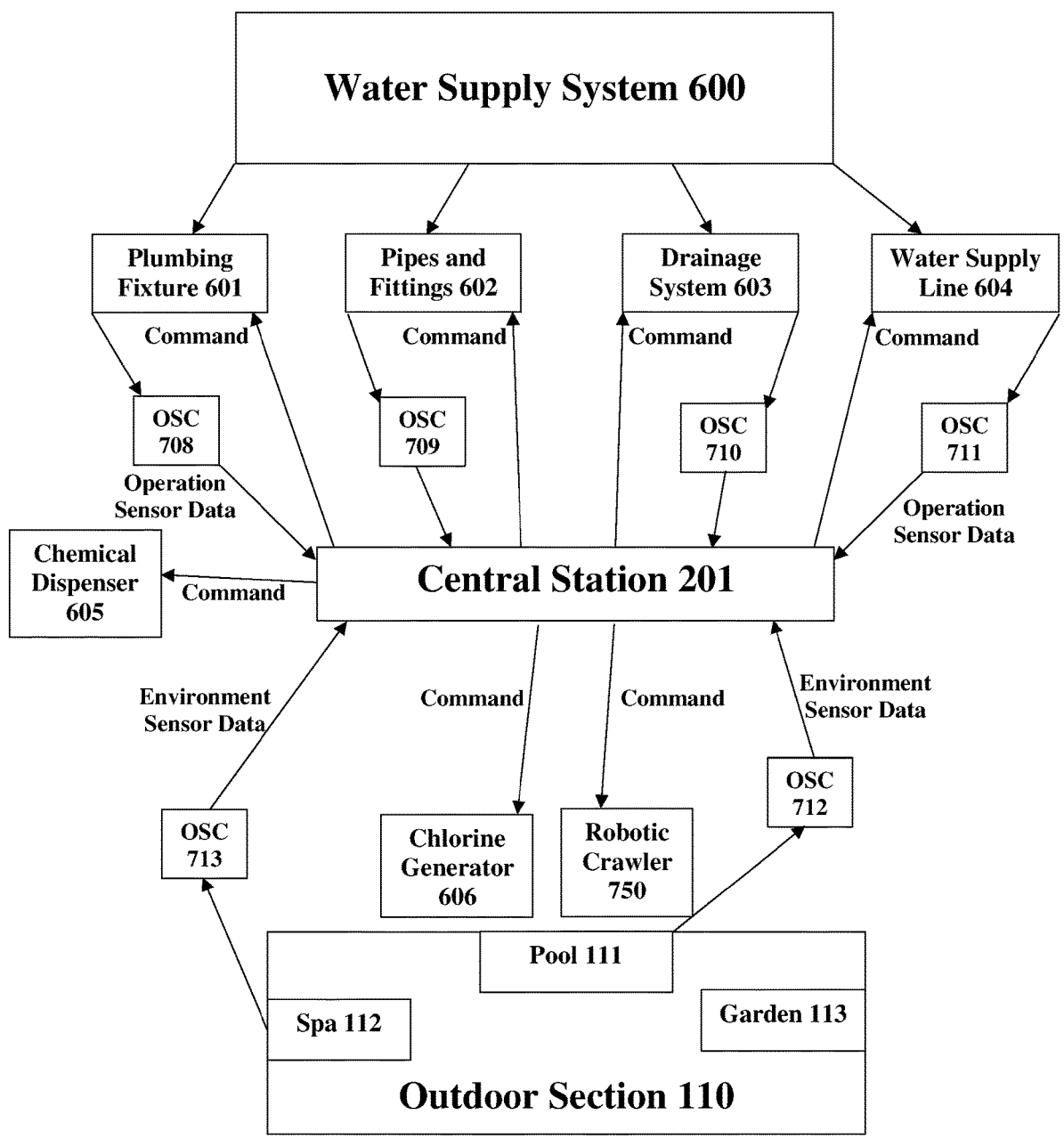
FIG. 5 is a block diagram of the monitoring system according to the first embodiment having the central station and a water quality monitor system for monitoring and regulating quality of water in the utility equipment responsible for conveying water in the indoor section and the outdoor section.

FIG. 5 is a block diagram illustrating the central station 201 and a water quality monitor system connected to the water supply system responsible for conveying water in the indoor section 100 and the outdoor section 110. The water quality monitoring system includes a plurality of operation sensor clusters 708, 709, 710 either directly connected to or disposed near the water supply line 600, plumbing fixtures 601, pipes and fittings 602, and drainage system 603 respectively. Please note that each of the operation sensor clusters 708, 709, 710 may further include sensors of different functions and sizes and these sensors may be disposed in separate locations and not clustered in a confined space.

The operation sensor cluster 708 connected to the plumbing fixtures 601 includes chemical sensors configured to measure mineral buildups in the water heater of the plumbing fixtures 601 and generate operation data corresponding to the mineral buildups detected. As illustrated in FIG. 5 the water utility device further includes a chemical dispenser 605 connected to the central station 201 and disposed near the water heater of the plumbing fixtures 601. The central station 201 is configured to process the operation data to determine the mineral buildups level. If mineral buildups reach a level that requires chemical descaling, the central station 201 can automatically activate the chemical dispenser 605 to deliver descaling chemical to the water heater to reduce the mineral buildups and ensure that the heating efficiency of water heater is not compromised over time.

The operation sensor clusters 708, 709, 710 also include total dissolved solids (TDS) sensors directly connected to or disposed near, plumbing fixtures 601, pipes and fittings 602, drainage system 603, and the water supply line 604 respectively. The central station 201 can then build a water usage profile mapping high and low TDS conditions in real time based on the TDS measurements. Customizable alerts for out-of-range TDS can indicate issues needing action. The central station 201 can perform complex pattern analysis across the various TDS sensors in the water utility equipment to pinpoint specific weak links contributing to broader high TDS issues. For example, isolating one branch line feeding the kitchen faucet is an unusual source of hardness contamination. If particular high TDS hotspots are identified, like the kitchen area, the central station 201 could automatically control the above-mentioned water utility equipment to divert some inlet water from the water supply line 604 to an under-the-sink or end-line purification unit dynamically to provide lower TDS filtered water on demand specifically to problem areas rather than entire home filtration.

Further, more chemical dispenser 605 can be disposed near different parts of the water utility system including the plumbing fixtures 601, pipes and fittings 602, and drainage system 603, and water supply line 604. The central station 201 can process the operation data from the TDS sensors and automatically activate the chemical dispenser 605 to deliver descaling chemical to water utility equipment to reduce TDS buildups. Also, the water utility equipment, including the water supply line 600, plumbing fixtures 601, pipes and fittings 602, and drainage system 603 have filters configured to filter undesirable TDS such as minerals, salts, metals, cations, or anions dissolved in water within the water utility equipment. The operation sensors 708, 709, 710, 711 can be configured to measure the filter usage such as how much TDS has the filter collected and generate filter operation data. The central station 201 then processes the filter operation data to determine filtration usage analytics by using data on how much TDS the filter has collected, the filtration capacity of each filter, and/or how long has the filter been replaced, to arrive at a filtration usage analytics for the network of filters in the water utility equipment. The central station 201 can then wirelessly and automatically order replacement or service of filters based on the filtration usage analytics.

In addition, the chemical dispenser 605 can be fitted with cartridges of beneficial minerals such as calcium, magnesium, and potassium for balancing acidity pH in the water of the water utility equipment. The operation sensor clusters 708, 709, 710, 711 can be configured to measure the pH in the water of the water utility equipment and generate corresponding acidity operation data. The central station 201 can process the acidity operation data from the operation sensor clusters 708, 709, 710, 711 and then activate the chemical dispenser 605 to dispense the beneficial minerals to balance the acidity pH in the water as needed.

In the first embodiment illustrated in FIG. 5, the water quality monitoring system is also configured to measure the water quality in the water utility equipment in the outdoor section 110. The water quality monitoring system further includes a plurality of operation sensor clusters 712, 713, 714 disposed near the pool 111, a spa 112, and a garden 113 of the outdoor section 110. The operation sensor clusters 712, 713 disposed near the pool 111 and spa 112 can be configured to measure sanitation and acidity pH levels of water in the two areas and generate corresponding operation data. The outdoor section 110 can be fitted with chemical dispenser 605 and an electrolytic chlorine generator 606 both connected to the central station 201. The central station 201 can process the operation data from the operation sensor clusters 712, 713 and automatically adjust the dispensing of beneficial chemicals by the chemical dispenser 605 or the chlorine production by the electrolytic chlorine generator 606 to improve the water quality in the pool 111 and spa 112 as needed. Please note that each of the operation sensor clusters 712, 713, 714 may further include sensors of different functions and sizes and these sensors may be disposed in separate locations and not clustered in a confined space.

As illustrated in FIG. 5, the water quality monitoring system further includes a robotic crawler 750 equipped with spectroscope sensors that breaks the light from a single material into its component colors the way a prism splits white light into a rainbow. The robotic crawler 750 also records the optical spectrum, which allows the central station 201 to analyze the spectrum and discover properties of the material interacting with it. The robotic crawler 750 also has camera to record images of the surround areas. The robotic crawler 750 can be deployed in the pool 111 to take a spectroscopic scan and record images of the area to look for biological contaminants, volatile compounds, or other clarity issues in real-time and generate corresponding operation data. The robotic crawler 750 is wirelessly connected to the central station 201 and thus the central station 201 can automatically take treatment actions such as adjusting the dispensing of beneficial chemicals by the chemical dispenser 605, adjusting the chlorine production by the electrolytic chlorine generator 606, or wirelessly ordering external pool cleaning service.

The pool 111 and spa 112 are equipped with various electrical equipment such as lighting, chemical dispenser 605, electrolytic chlorine generator 605, jets, temperature control systems, etc. The operation sensors 712, 713 disposed near the pool 111 and spa 112 can be configured to measure the energy usage of the above-mentioned equipment and generate corresponding operation data. On the other hand, the central station 201 includes a network device configured to wirelessly receive weather forecasts and send historical energy usage operation data to a cloud storage. Thus, the central station 201 can first determine a historical energy usage pattern based on the historical energy usage operation data stored in the cloud storage. The central station 201 can then make adjusts to the operation and scheduling of the equipment in the pool 111 and spa 112 based on local weather forecasts, historical energy usage patterns, and operation data from the operation sensors 712, 713 to minimize energy costs for operating the pool 111 or spa 112.

Figure 6:
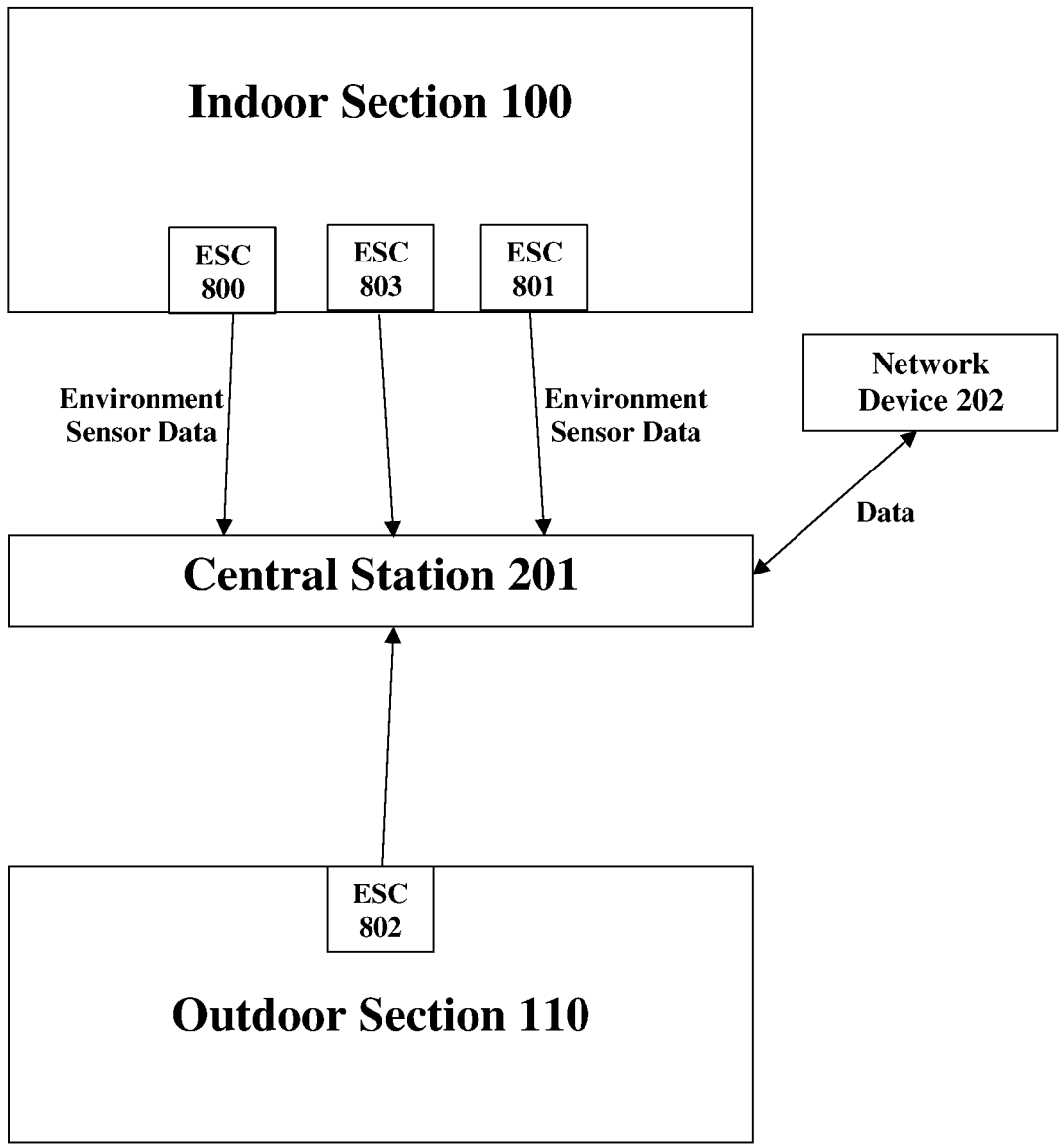
FIG. 6 is a block diagram of a block diagram of the monitoring system according to the first embodiment having the central station and an undesirable activity detector system configured to expose hazardous or illegal activities occurring in the indoor section or the outdoor section.

FIG. 6 is a block diagram illustrating the central station 201 and an undesirable activity detector system configured to expose hazardous or illegal activities occurring in the indoor section 100 or the outdoor section 110. The undesirable activity detector system includes an environment sensor 803 connected to the electrical panel of the home environment to receive electricity patterns data in real-time. The central station 201 can process the electricity patterns data to determine the electricity usage patterns and detect unusual power spikes that signify grow light and heavy use of HVAC 500. The central station 201 can also wirelessly receive data, using the network device 202, on known marijuana grow and method lab energy usage profiles and compare those with the operation data obtained. Please note that the environment sensor cluster 803 may further include sensors of different functions and sizes and these sensors may be disposed in separate locations and not clustered in a confined space.

The undesirable activity detector system further includes an environment sensor cluster (ESC) 800 configured to measure radio frequency (RF) signals. The central station 201 can wirelessly receive data, using the network device 202, on known RF signal generated by unauthorized electronics (like grow lights) analyze the RF signals to determine if the signals detected correspond to those typically generated by unauthorized electronics. The undesirable activity detector system also includes a plurality of environment sensor clusters 801, 802 respectively disposed in various locations of the indoor section 100 and the outdoor section 110.

The environment sensor clusters 801, 802 include gas chromatography sensors such as gas density balance detector (GDB), thermal conductivity detector, flame ionization detector, thermos iconic detector, and flame photometric detector that are configured to detect ambient traces of common marijuana/meth manufacturing chemicals like THC, ammonia, and acetone in both sections 100, 110 and generate corresponding environment data. The central station 201 can process the environment data from the environment sensor clusters 801, 802 to determine if there are traces of undesirable chemicals. The environment sensor clusters 801, 802 also include optical sensors that convert light or a change in light, into electronic signals. The central station 201 can process the above-mentioned data on light or a change in light to determine if the electromagnetic radiation spectrum in the indoor section 100 or outdoor section 110 corresponds to that of light generated by typical marijuana grow lamp, even concealed by walls. Please note that each of the environment sensor clusters 801, 802 may further include sensors of different functions and sizes and these sensors may be disposed in separate locations and not clustered in a confined space.

In addition to the sensors described above, other types of sensors can be placed in various parts of the indoor section 100 and outdoor section 110 to facilitate existing systems for advanced telemetry. For instance, a strip of Hall effect indexer/sensors could be placed to detect the rotation of magnetic elements in mechanical devices like fans, wheels, and gears to Log pulses with timestamps tracks starts, stops, and revolutions over time. Also, RF emission probes and antennas configured to be Internet-of-Things (IoT)-enabled spectrum analyzers could detect EMI signatures or hidden electromagnetic frequencies from electric components, wherein the probes keep track of changes in RF noise profiles to expose control/switching issues in devices like motors. Further, accelerometer can be coupled with machines like air compressors and treadmills using wires or other components to detect vibration signatures. The central station 201 can then catalog the vibration signatures and then deduce vibration patterns of the machines using envelope theorem analysis in order to detect missing higher frequencies over time within the machines.

Low-power or other image sensors can be used together with cameras to create stereo-depth models of a machine's (such as air compressor and treadmills) moving components for periodic motion tracking without physical contact. The central station 201 can then use the data from said image sensors and cameras to generate 3D kinetic profiles and then compare the generated profiles with ideal 3D kinetic profiles to discover and expose existing mechanical wears. Also, small RF receives can be placed inside or near various utility equipment and configured to log the time, encoding ID, and signal strength of wireless signals received from other devices. The above-mentioned information embedded in the received RF signals can be used to determine precisely which device RF resonances may cause fatigue in materials of the utility equipment over time.

Further, at least one of the above-mentioned operation sensor clusters includes solid-state magnetometers placed around various utility equipment to form a grid designed to detect electromagnetic leakage or electromagnetic interference (unwanted noise or interference in an electrical path or circuit caused by an outside source). More specifically, solid-state magnetometers can be placed around power electronics of the utility equipment. The central station 201 can take measurements from the solid-state magnetometers and map electromagnetic leakage or electromagnetic interference around the power electronics for the manufacturer to improve the shielding of the power electronics or assess the health impacts due to those electromagnetic leakage or electromagnetic interference.

Also, at least one of the above-mentioned operation sensor clusters include a system of wired vibration multiplexers that include one accelerometer and a plurality of wires connected to various location of the indoor section 100 and outdoor section 110 such as windows. Through one wire at a time, the accelerometer sequentially captures vibrations occurring across various location of the indoor section 100 and outdoor section 110 to achieve wide coverage with the use of only one single accelerometer.

The environment sensor clusters of the present disclosure further includes a plurality of semi-passive temperature loggers having thin traces and etched on the surfaces of various utility equipment. The temperature loggers can be woke up with periodic RF signals measure temperature of said utility equipment. The central station 201 then take those temperature measurements and map thermal operating gradients over various areas of the indoor section 100 and outdoor section 110.

The environment sensor clusters further includes passive harmonic RF retroreflectors that are self-powered RFID-like tags embedded on devices passively retransmit their ID when triggered by scanning reader beams. The RF retroreflectors are useful for inventory tracking of valuables or critical equipment prone to theft/loss. The environment sensors also includes Bluetooth Low Energy (LE) modules disposed at various locations of the indoor section 100 and outdoor section 110 and enabled as beacons or passive listeners for presence detection. The Bluetooth LE modules can be configured to identify proximity of portable assets, access of doors or windows, occupancy detection, etc.

Figure 7:
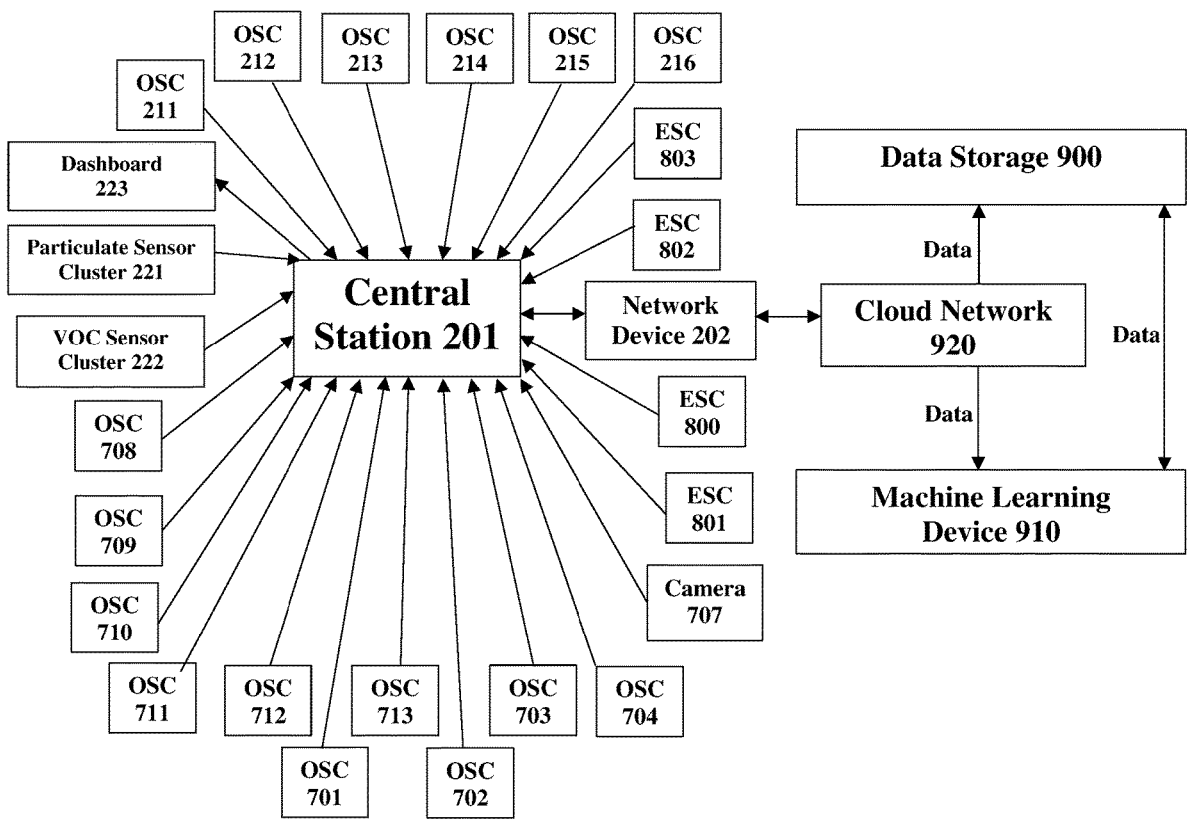
FIG. 7 is a block diagram of a monitored home environment in accordance with a second embodiment of the present disclosure having a remote data storage device and a machine learning device.

FIG. 7 is a block diagram of a monitored home environment in accordance with a second embodiment of the present disclosure. In the present embodiment, the monitoring system further includes a remote data storage device 900 configured to store the above-mentioned operation data, environment data, user behaviors, and external data such as weather forecasts and energy pricing data. The monitoring system further includes a remote machine learning device 910 connected to the storage device and configured to learn from data stored in the data storage device 900 to provide services such as recommendations for reducing energy costs and prediction of utility device breakdowns to prepare maintenance ahead of time. The data storage device 900 and machine learning device 910 are connected to the central station 201 through cloud network 920. The machine learning device 910 can be trained using the above-mentioned data stored in the data storage device 900 to provide the manufacturers of the utility equipment insight into the utility equipment's status and their overall state of health for future improvements.

For instance, the operation data includes total and cycle on/off times or so-called run-times of the utility equipment describes the length of time the specific utility device takes to run. The run-time operation data gives machine learning device 910 insight into the cycling frequency of the utility device and whether the utility device has adequate capacity or size to handle the need of the indoor section 100 or outdoor section 110. The operation data can also help machine learning device 910 learn the set-point adherence of the utility device. For instance, deviation from programmed temperature set point of a water heat suggests variance in delivered heating/cooling vs. designed performance. The operation data related to energy consumption can also help machine learning device 910 learn how electrical components and gas usage affect the overall efficiency of the system.

Further, the operation data related to timing and location of component failures, faults requiring manual resets and error codes can also aid machine learning device 910 in learning reliability assessment of the utility equipment. At least one of the above-mentioned operation sensor clusters also includes sound measurement devices disposed near components of utility equipment that generate large sound such as compressors and fans to measure sounds and generate corresponding operation data. The central station 201 then processes the operation data and determine the noise generation by the components at different operating levels. The manufacturer can then use the information to determine the suitability of the components across various home use cases.

The machine learning device 910 can also be configured to extract various information from the operation data to obtain insight of how the particular system is functioning. For instance, the machine learning device 910 can process operation data related to a compressor to determine the number of start/stop cycles of the compressor, wherein frequent cycling indicates undersized capacity, while minimal cycles can point to oversizing. The manufacturer can then improve and optimize the compressor for future use. Also, the machine learning device 910 can process the operation data on the compressor to determine its cycle frequency over time, wherein increased cycling over the years could indicate performance decline needing proactive replacement or maintenance. In another instance, the machine learning device 910 can process the operation data on the compressor to determine the temperature difference between return air temperature and supply air temperature when the compressor turns on/off and then verify that intended delta T settings are met. The machine learning device 910 can also process the operation data on the compressor to arrive at the compressor's actual runtimes at various speed and compare it with the expected runtimes to determine if modification or repair is required. Last but not least, the machine learning device 910 can process the operation data that capture electrical load capacity of the compressor across various operating modes to determine the compressor's power draw profile and evaluate its smart grid harmonization potential.

In another example, the machine learning device 910 can process operation data related to a fan to determine the airflow rates of the fan in terms of cubic feet per minute and whether there is reduced airflow over time that indicates duct blockages or fan wear needing cleaning or replacement. The machine learning device 910 can process operation data related to the fan to determine its fan speeds or runtimes at different torque or revolution per minute and whether the fan requires modulation. Last but not least, the machine learning device 910 can also process operation data related to the power consumption of the fan and use the above-mentioned airflow rates information to determine if the energy usage per airflow rate ratio correspond to the efficiency the manufacture claims for the fan.

Operation data related to the HVAC recorded over the long term can be analyzed to provide actionable design feedback and functional awareness. The operation sensor configured to monitor the HVAC generates various information on the status of components of the HVAC. The information includes fault codes associated with fail component failures such as circuit board issues and stuck sensors. The machine learning device 910 can process the operation data relates to fault codes to extract information such as how often various faults occur surface to provide manufacturer with insight into replacement part lifespans needed to minimize downtime, the length of fault states to pinpoints binding that makes it hard to diagnose problems and causing excessive outages, and conditions that immediately precede fault codes to highlight stress conditions so that manufacturers prescribe remedial measures to eliminate fault triggers.

Operation data on HVAC collected across various scenarios also provides tangible performance feedback for manufacturers to improve reliability, diagnostics, operating cost efficiency, and overall equipment effectiveness in future product generations. For instance, the ambient range where HVAC remains heating or cooling shows operating range and hardware resiliency of the HVAC. Deviation from recommended set point ranges for energy optimal performance reveals user's willingness to compromise efficiency for comfort. The central station 201 or machine learning device 910 can also track occupant manual overrides or schedule changes against energy prices that demonstrate a real-time willingness to reduce consumption if appropriately incentivized. Further, field data collected over long-term including operation data related to the HVAC, environment data on various ambient conditions such as temperature and humidity, and user adjustments via user interface allows manufacturers to derive additional engineering insights to refine system sizing, component behavior, and user preferences for future product generations.

The monitoring system further includes a dashboard 223 connected to the central station 201 and configured to display various information such as air quality, water quality, energy usage trends based on the operation data and environment collected by the central station 201. The dashboard 223 can be a touchscreen having speakers. In the present embodiment, the central station 201 is connected to external servers such as that of a power company to obtain information regarding energy prices. Thus, the central station 201 station can calculate the current energy bill based on the energy usages measured by various sensors and the energy prices from external server and configure the dashboard 223 to display such information for the user's review. The central station 201 can also be connected to weather station servers to receive weather forecast and configured the dashboard 223 to display said information. Further, in response to determining that a safety threat occurs, the central station 201 can present warning/alert and recommendation solution/s on the dashboard 223 for the user's review. The dashboard 223 provides the occupants with real-time visual feedback on the financial impact their activities created and then can be used to motivate occupant behavior changes when they can directly see the impacts activities have.

Further, the environment sensors of the present disclosure can be used to measure outdoor physical parameters such as temperatures and humidity and generate corresponding environment data. The information in the environment data can be compared with indoor set points to arrive at various load capacities of the utility equipment. For instance, the temperature differential (delta T) between indoor set points and outdoor ambient temperatures indicate the cooling/heating load intensity. Also, the machine learning device 910 can analyze indoor and outdoor humidity profiles and determine if the moisture removal capability of the current dehumidifier is adequate for the requirement set by the occupants of the indoor section 100.

In different embodiments, the utility equipment in the indoor section 100 and outdoor section 110 are existing legacy equipment that do not output meaningful electronic data for the central station 201 to process in order to determine the performance of said legacy equipment. The operation sensor clusters of the present disclosure can be used to augment the monitoring capabilities of the central station 201 on said legacy equipment and provide simple and cost-effective means to capture and record meaningful data from legacy equipment without the need for replacing the legacy equipment with smart equipment. The key premise is developing inexpensive, non-invasive 'armor' out of modern sensors, tiny controllers, and wireless connectivity to overlay operational visibility and insight onto aging legacy equipment.

For instance, legacy measurement equipment such as old boilers temperature controller, pool chemical monitor, air quality gauge readers, battery bank voltage indicators do not output electronic data for the central station 201 to process. However, the above-mentioned legacy measurement equipment can be divided into multiple segment each showing different status of the associated utility device. An operation sensor cluster having a camera can be configured to generate image data of the legacy measurement equipment. The central station 201 can then use computer vision and optical character recognition (OCR) algorithms to detect and log changes of measurements over time.

The operation sensor clusters include Arduino-style logging devices that could be installed over the relay or main power connections of any electric equipment, such as air compressors, treadmills, power tools, etc., to capture real-time load current profiles. The central station 201 can process the load current profiles, detect deviations like stalled motors or abrupt drops in current over time that indicate potential issues, and generate alert for users or manufacturer to act upon.

The operation sensors of the present disclosure can also be used to keep track of operation of egress equipment such as garage doors and locking gates. Egress equipment such as garage doors or locking gates have open/closed states. The operation sensors include arrays of 3D printed micro contact switches positioned near the egress equipment and configured to trigger each time state changes and generate operation data indicate such state changes. The central station 201 can then remotely log the operation data and generate alert as needed without needing to fit the egress equipment with digital interfaces that generate electronic signals.

Legacy mechanical components in various utility device such as diesel generators, pool pumps, and fans are not typically fitted with digital interface that output electronic signals that indicate their respective performance. The operation sensors of the present disclosure include microphone sensors disposed near the above-mentioned legacy mechanical systems and configured to capture their sound spectrum and generate corresponding operation data. The central station 201 then process the operation data to detect unusual harmonics or vibrations in the sound spectrum to detect declining performance in legacy mechanical systems and order maintenance or generate alert as needed. Further infrared sensors can be disposed near legacy mechanical systems such as motors, transformer, and exhaust pipes and configured to periodically measure temperatures of said systems. The central station 201 then processes and log the operation data from the infrared sensors to determine if unusual or unexpected heat buildup is occurring and generate alerts to avoid imminent failures in legacy mechanical systems and safety incident.

Please note that the central station 201 includes a non-transitory computer-readable storage medium storing one or more programs or instructions and at least one processor. When executed by the processor of the central station 201, the programs or instructions cause the central station 201 to determining conditions of utility devices of home based on at least the above-mentioned operation data and environment data, determine an occurrence of a safety threat based on at least the operation data and the environment data, and manipulate at least one of the utility devices (such as HVAC 500 and water supply system 600) to remedy or eliminate the safety threat, if the safety threat is determined to exist.

Figure 8:
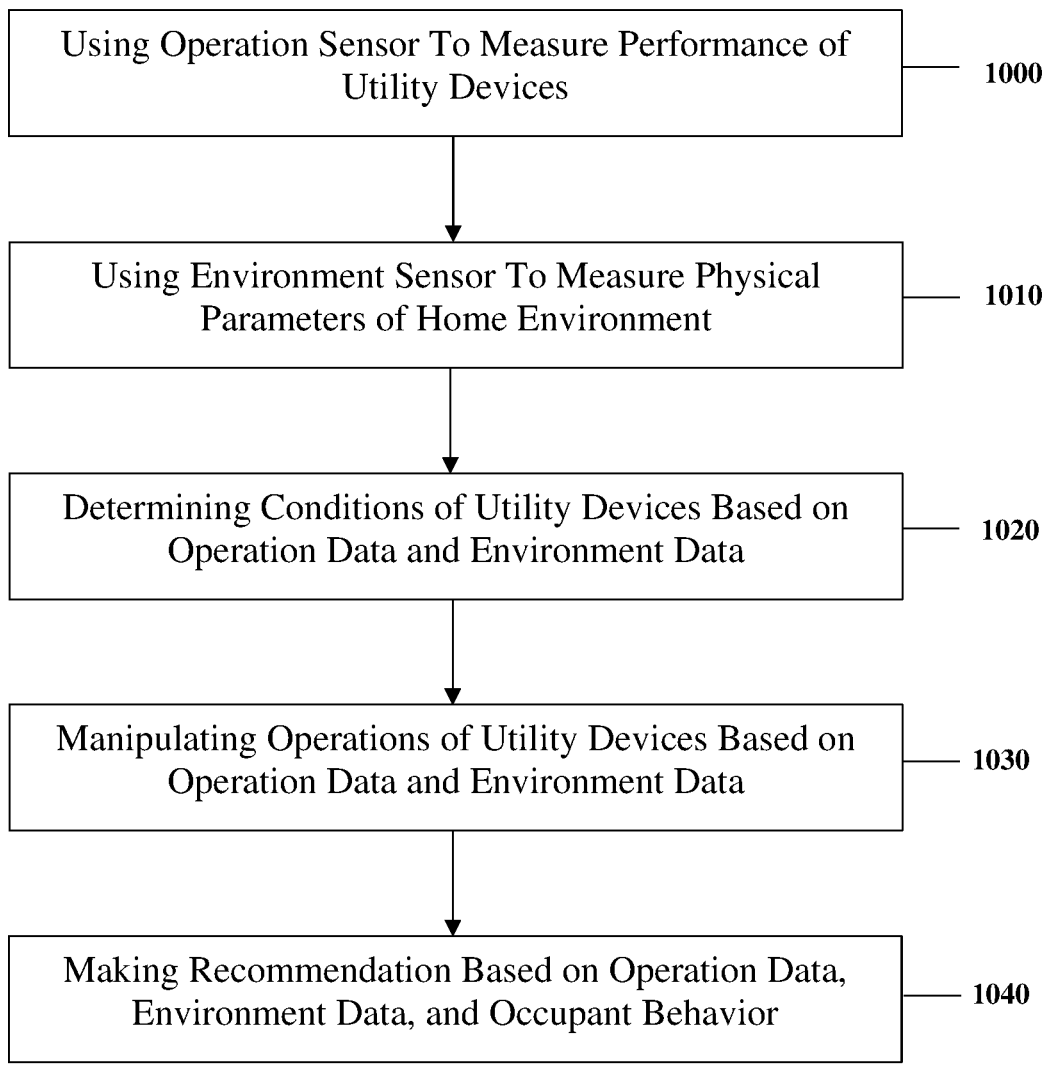
FIG. 8 is a flow chart of a method for monitoring a home environment according to a third embodiment of the present disclosure.

FIG. 8 is a flow chart of a method for monitoring a home environment according to a third embodiment of the present disclosure. The method includes step 1000 of using a plurality of operation sensors to measure performance of the utility devices and generate corresponding operation data. The operation sensors includes vibration sensors, temperature sensors, and acoustic sensors configured to measure vibration, temperature, and sound associated with the utility equipment in the home environment (such as HVAC and water supply system).

The method includes step 1010 of using a plurality of environment sensors to measure physical parameters of the home and generate corresponding environment data. The environment sensors include hyperlocal particulate sensor cluster and VOC sensor cluster placed in building ductwork (such as duct system 506) and hallways to pinpoint specific units responsible for emitting contamination. The environment sensors include cameras and robotic crawlers for taking pictures of the environment.

The method further includes step 1020 of determining conditions of the utility devices based on at least the operation data and the environment data. Step 1020 includes making use of a central station connected to the above-mentioned operation sensors to receive operation data and environment sensors to receive environment data. The central station then process the operation data in order to detect early signs of wear, suboptimal efficiency, or degradation needing repair and proactively send alerts before outright failure occurs to prevent discomfort or accident. The central station can then create an airflow map using the operation data generated by the operation sensor cluster to map out the air flow in the duct system of the air supply system. Also, the central station can use both the sound operation data and the real-time water flow rate data to identify the location of leaks in the water supply system early The method further includes step 1030 of manipulate operations of at least one of the utility devices based on the operation data and the environment data. For instance, the central station is connected to the utility equipment responsible for heating, ventilating, and cooling air in the home environment. The central station can use other data such as pressure in the outdoor section and occupancy patterns in various zones of the indoor section to arrive at a more accurate airflow map within both the duct system and the indoor section as a whole. Further, utilizing airflow mapping of the home's ductwork through atmospheric pressure sensors, indoor/outdoor air quality data, and occupancy patterns in different zones in the indoor section allows the central station to intelligently direct fresh air ventilation to spaces with occupants that needing it most to balance air quality and energy efficiency. The utility equipment also includes smart windows that the central station can activate to further optimize the ventilation rate to improve air quality within the indoor section. Should high VOC signatures associated with cleaning products or cooking smoke are suddenly detected, the central station can first automatically open smart windows and then engage fume hood ventilation before circulating possibly contaminated air to other areas through HVAC.

In another instance, the central station is connected to the water supply system for supplying clean water to both the indoor and outdoor sections of the home environment. The central station includes a network device configured to wirelessly receive temperature forecasts and energy prices from external devices. The central station can also determine usage patterns of the water heater by analyzing the operation data from the operation sensors. The central station can then adjust the operation of water heater to intelligently optimize water heating schedules and temperature settings to ensure hot water availability when needed while minimizing standby losses and energy costs, integrating electric, gas, and solar thermal sources seamlessly. The central station can use both the sound operation data and the real-time water flow rate data to identify the location of leaks in the water supply system. Upon detection, the central station could automatically shut-off water or divert water flow away from the damaged sections causing the leaks and then send an inspection request to minimize water loss or prevent mold risks.

In yet another instance, the operation sensors for monitoring the water supply system include total dissolved solids (TDS) sensors. The central station can then build a water usage profile mapping high and low TDS conditions in real time based on the TDS measurements. Chemical dispenser can be disposed near different parts of the water supply system. The central station can process the operation data from the TDS sensors and automatically activate the chemical dispenser to deliver descaling chemical to water utility equipment to reduce TDS buildups. The operation sensors also include ones configured to measure the pH in the water of the water utility equipment and generate corresponding acidity operation data. The central station can process the acidity operation data from the operation sensor clusters and then activate the chemical dispenser 605 to dispense the beneficial minerals to balance the acidity pH in the water as needed.

The method further includes step 1040 of make recommendations based on at least the operation data, the environment data, and behaviors of at least one occupant of the home. The data collected using operation sensors and environment sensors and data received from external servers (such as energy price and weather forecast) can be stored locally in the central station or in a remote data storage device. The central station can process the data stored locally to provide services such as recommendations for reducing energy costs and prediction of utility device breakdowns to prepare maintenance ahead of time. If the data is stored in a remote location, a remote machine learning device can be used to learn from the same data and provide recommendations. The machine learning device can also be trained using the above-mentioned data stored in the data storage device to provide the manufacturers of the utility equipment insight into the utility equipment's status and their overall state of health for future improvements.

Please note that the above-mentioned method relates to the central station's non-transitory computer-readable storage medium configured to store one or more programs and at least one processor. When executed by one or more processor of the central station, causes the central station to perform the steps of determining conditions of utility devices of home based on at least the above-mentioned operation data and environment data, determine an occurrence of a safety threat based on at least the operation data and the environment data, and manipulating at least one of the utility devices (such as HVAC 500 and water supply system 600) to remedy or eliminate the safety threat, if the safety threat is determined to exist, discussed above.

The foregoing descriptions of specific implementations have been presented for purposes of illustration and description. They are not intended to be exhaustive or to limit the invention to the precise forms disclosed, and modifications and variations are possible in view of the above teaching. The exemplary implementations were chosen and described to best explain the principles of the invention and its practical application, to thereby enable others skilled in the art to best utilize the invention and its implementations with modifications as suited to the use contemplated.

It is therefore submitted that the invention has been shown and described in the most practical and exemplary implementations. It should be recognized that departures may be made which fall within the scope of the invention. With respect to the description provided herein, it is submitted that the optimal features of the invention include variations in size, materials, shape, form, function, manner of operation, assembly, and use. All structures, functions, and relationships equivalent or essentially equivalent to those disclosed are intended to be encompassed by the invention.

The invention claimed is:

1. A monitoring system for monitoring a home environment having a plurality of utility devices, comprising:
    one or more operation sensors each placed near one of the utility devices and configured to generate operation data associated with performance measurements of the utility devices;
    one or more environment sensors distributed in various parts of the home environment and configured to generate environment data associated with physical attributes of the various parts of the home environment; and
    a central station signally connected to the utility devices, the operation sensors to receive the operation data, and the environment sensors to receive the environment data, wherein the central station is configured to:
    determine conditions of the utility devices based on at least the operation data and the environment data;
    manipulate at least one of the utility devices based on at least the operation data and the environment data based on the determined conditions of the utility devices; and
    make recommendations based on at least the operation data, the environment data, and behaviors of at least one occupant of the home environment.

2. The monitoring system of claim 1, wherein the central station is further configured to:
    determine an occurrence of a safety threat based on at least the operation data and the environment data; and
    manipulate at least one of the utility devices to remedy or eliminate the safety threat, if the safety threat is determined to exist.

3. The monitoring system of claim 1, further comprising a machine learning device, wherein the central station includes:
    a communication device configured to receive external data including weather forecasts and energy pricing data;
    a user input device configured to accept user preferences;
    wherein the machine learning device generates a user behavior data based on the user preferences and the operation data, the machine learning device generates an energy optimization plan based on the user behavior data, the environment data, and the external data, the central station activates or adjusts operations of at least one of the utility devices based on the energy optimization plan.

4. The monitoring system of claim 1, further comprising:
    a storage device configured to store the operation data and the environment data; and
    a machine learning device connected to the storage device and the central station, wherein the machine learning device is configured to generate a maintenance plan based at least on the operation data, the central station then generates a maintenance request based on the maintenance plan.

5. The monitoring system of claim 1, wherein the utility devices includes an air supply system connected to the central station and having a heating portion, ventilation portion, and a cooling portion, wherein
    the operation sensors are configured to measure the performance measurements of the heating portion, the ventilation portion, and the cooling portion;
    the central station is configured to:
    determines conditions of the heating portion, the ventilation portion, and the cooling portion based on the associated performance measurements;
    generates an alert if the condition of any of the heating portion, the ventilation portion, and the cooling portion is determined to be needing repair or replacement;

receive external data including temperature forecasts and energy price data; and regulate operations of the air supply system based on the external data and the associated performance measurements.

6. The monitoring system of claim 1, the utility devices includes:

an air supply system connected to the central station and having a ventilation portion and a filter portion; wherein the operation sensors are configured to measure an air quality in the home environment and generate an indoor air quality data;

the environment sensors are configured to measure an air quality outside the home environment and generate an outdoor air quality data;

the central station is configured to:

determine an air contamination hotspot in the home environment based on the indoor air quality data and the outdoor air quality data;

receive external data including air quality forecasts; and activate at least one of the ventilation portion and the filter portion based on the indoor air quality data, the outdoor air quality data, and air quality forecasts.

7. The monitoring system of claim 1, wherein the utility devices includes a water supply system connected to the central station, wherein the operation sensors are configured to measure the performance measurements of the water supply system;

the central station is configured to:

detect leaks and failures in the water supply system based on the associated performance measurements and divert water flow in the water supply system;

receive external data including temperature forecasts and energy price data; and regulate operations of the water supply system based on the external data and the associated performance measurements.

8. The monitoring system of claim 1, wherein the utility devices includes:

a water supply system connected to the central station; and a treatment device connected to the central station;

the operation sensors are configured to measure a water quality of the water supply system and generate a water quality data;

the central station is configured to:

determine a water contamination hotspot in the water supply system based on the water quality data;

controls the treatment device to release treatment chemicals to the water contamination hotspot in the water supply system; and generate and send orders for treatment chemicals and filters.

9. The monitoring system of claim 1, wherein the central station is configured to determine an occurrence of an illegal activity or a hazardous activity based on the operation data from the operation sensors and the environment data from the environment sensors.

10. The monitoring system of claim 1, further including a storage device configured to store the operation data and the environment data, wherein the central station send the operation data and the environment data stored in the storage device to an external device.

11. A method for monitoring a home environment having a plurality of utility devices, comprising:

placing at least one operation sensor near every one of the utility devices;

using the operation sensors to measure performance parameters of the utility devices and generate corresponding operation data;

placing environment sensors in various parts of the home environment;

using a plurality of environment sensors to measure physical attributes of the various parts of home environment and generate corresponding environment data;

determining conditions of the utility devices based on at least the operation data and the environment data;

manipulating at least one of the utility devices based on at least the operation data and the environment data based on the determined conditions of the utility devices; and making recommendations based on at least the operation data, the environment data, and behavior of at least one occupant of the home environment.

12. The monitoring method of claim 11, further comprising:

determining an occurrence of a safety threat based on at least the operation data and the environment data; and manipulating at least one of the utility devices to remedy or eliminate the safety threat, if the safety threat is determined to exist.

13. The monitoring method of claim 11, further comprising:

receiving external data including weather forecasts and energy pricing data;

generating an energy optimization plan based on the operation data, the environment data, and the external data; and activating or adjusting operations of at least one of the utility devices based on the energy optimization plan.

14. The monitoring method of claim 11, further comprising:

storing the operation data and the environment data;

generating a maintenance plan based at least on the operation data and the environment data; and generating a maintenance request based on the maintenance plan.

15. The monitoring method of claim 11, further comprising:

analyzing the utility device to determine the performance parameter to measure;

choosing the operation sensor based on the performance parameter of the utility device to measure;

installing the operation sensors on or near the utility devices; and configuring the operation sensors to measure the performance parameter of the utility devices and generate the corresponding operation data.

16. A non-transitory computer-readable storage medium storing one or more programs, the one or more programs comprising instructions, which when executed by one or more processors of a central station, causes the central station to: determine conditions of utility devices deployed in f a home environment based on at least: operation data generated by a plurality of operation sensors each placed near one of the utility devices and configured to measure performance parameters of the utility devices; and environment data generated by a plurality of environment sensors distributed in various parts of the home environment and configured to measure physical attributes parameters of the home environment; determine an occurrence of a safety threat based on at least the operation data and the environment data; and manipulate at least one of the utility devices to remedy or eliminate the safety threat, if the safety threat is determined to exist.

17. The non-transitory computer-readable storage medium of claim 16, wherein the instructions, when executed by the processor of the central station, causes the central station to: determine an occurrence of a safety threat based on at least the operation data and the environment data; and manipulate at least one of the utility devices to remedy or eliminate the safety threat, if the safety threat is determined to exist.

18. The non-transitory computer-readable storage medium of claim 16, wherein the instructions, when executed by the processor of the central station, causes the central station to: receive external data including weather forecasts and energy pricing data; generate an energy optimization plan based on the operation data, the environment data, and the external data; and activate or adjust operations of at least one of the utility devices based on the energy optimization plan.

19. The non-transitory computer-readable storage medium of claim 16, wherein the instructions, when executed by the processor of the central station, causes the central station to: store the operation data and the environment data; generate a maintenance plan based at least on the operation data and the environment data; and generate a maintenance request based on the maintenance plan.

20. The non-transitory computer-readable storage medium of claim 16 wherein the instructions, when executed by the processor of the central station, causes the central station to: determine an occurrence of an illegal activity or a hazardous activity based on the operational data from the operation sensors and the environment data from the environment sensors.

* * * * *